O. H. BEUTLER.
ANTISKID CHAIN REPAIR LINK.
APPLICATION FILED NOV. 5, 1919.
1,338,851.
Patented May 4, 1920.
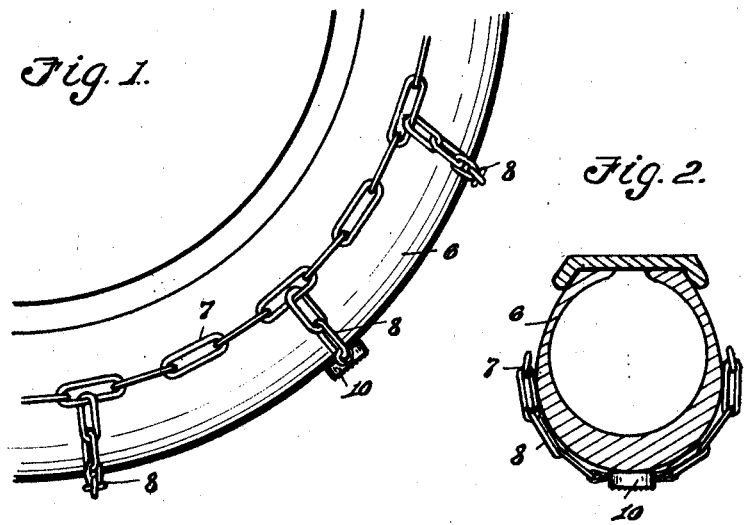
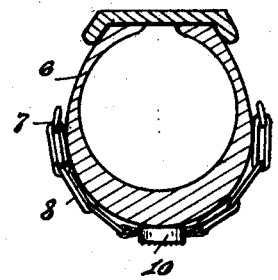
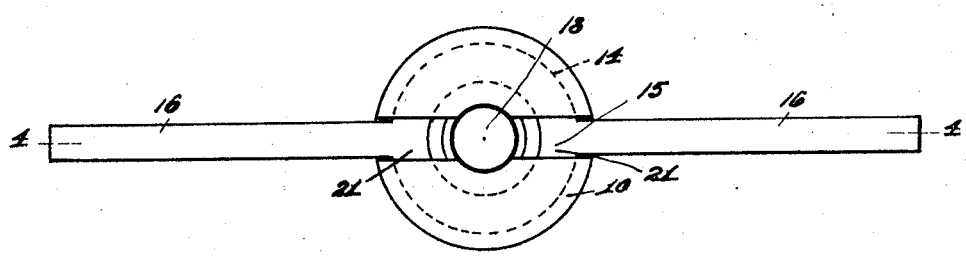
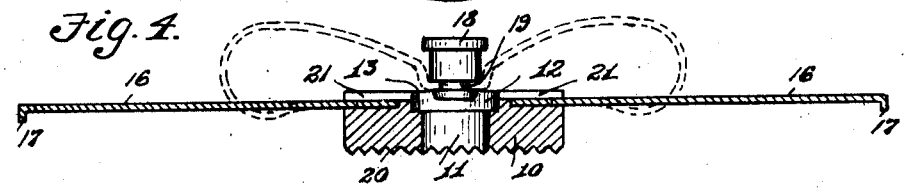
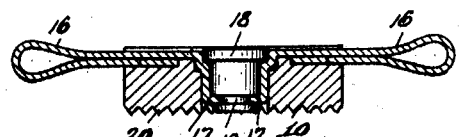
Oswald H. Beutler
INVENTOR
By George Ottsch
ATTORNEY.

UNITED STATES PATENT OFFICE.

OSWALD H. BEUTLER, OF SOUTH BEND, INDIANA.

ANTISKID-CHAIN REPAIR-LINK.

1,338,851. Specification of Letters Patent. Patented May 4, 1920.

Application filed November 5, 1919. Serial No. 335,970.

*To all whom it may concern:*

Be it known that I, OSWALD H. BEUTLER, a subject of Germany, residing at South Bend, in the county of St. Joseph and State of Indiana, have invented certain new and useful Improvements in Antiskid-Chain Repair-Links, of which the following is a specification.

The invention relates to improvements in antiskid chains for vehicle tires, particularly of the pneumatic type, and is more particularly adapted for the making of quick repairs in the cross members of the chain when such become worn through and severed.

As is well known, the center or intermediate links of the cross chains upon which the tread portion of the tire bears are subject to rapid wear, and when worn entirely through the free ends thereof in the rotation of the wheel frequently tend to strike the fenders of the automobile and damage the same, in which case it becomes necessary to remove the entire chain and losing the protection thereof against skidding, or withstand the damage that will follow by continuing the use thereof in such unrepaired state. In order to weld a new link or links in the worn chain requires considerable time, and it is the object of the present invention to provide a repair link for the purpose which will permit the repair to be rapidly and easily made, and which will be as durable and effective for the purpose intended as the replaced original links of the chain.

With the above and other objects in view, the invention in the preferred form of details will be described in the following specification, reference being had particularly to the accompanying drawings, in which:—

Figure 1 is a fragmentary side elevation of a tire and antiskid chain, showing one of the improved repair links applied to a cross chain.

Fig. 2 is a cross-sectional view showing the same parts.

Fig. 3 is a plan view of the repair link.

Fig. 4 is a sectional view thereof taken on line 4—4 of Fig. 3, the dotted lines showing the manner of bending and connecting the strip ends with the wedging plug preliminary to driving the latter to effective position.

Fig. 5 is a similar view showing the parts in operative relation.

Referring now more particularly to the drawings, the reference numeral 6 designates a tire casing or shoe, to which the antiskid chain 7 is applied in the usual and well known manner, and the cross chains 8 provide a gripping effect with the road or pavement to prevent skidding, in the manner which is also well understood in the art. As it is the link or links of the cross chains which come into contact with the road or pavement that quickly wear away, my quick repair link is primarily intended to replace such worn links, although the same are adapted for repairing any worn or broken links making up the chain as a whole.

The improved repair link preferably consists of a relatively thick metal body 10 of disk form, having a circular central aperture 11, which is enlarged at its upper portion 12, to provide an offset or shoulder 13. The body 10 has embedded therein the middle circular portion 14 of a flat metal stamping 15, having oppositely extending strips or tongues 16, terminally bent downwardly to provide hook portions 17. The stamping 15 is made of sheet metal having the desired degree of tensile strength, and sufficiently pliable to permit the strips 16 to be readily bent over upon themselves, as in the manner shown in Fig. 5. In the manufacture of the device, the stamping 15 is placed in a mold, and the body 10 cast thereabout so as to embed the same, the body preferably being of cast steel so as to resist rapid wear thereof.

Adapted to receive the hooked ends of the strips, is a wedge plug 18, corresponding in form, but of smaller dimension in diameter, than the aperture 11 in the body, the space allowed between the plug and the walls of the aperture at opposite points being very slightly less than the thickness of the strips. The plug is provided with an annular groove 19, adapted to receive the hook ends 17 of the strips, so that, with the plug forced to effective position within the aperture, as by means of a sharp hammer blow, the strip ends will be drawn in with the movement of the plug, and the aperture walls will prevent such hooked ends from disengaging from the groove, as will be apparent by reference to Fig. 5. In driving the plug to effective position within the aperture, the strip ends will be crimped and tightly wedged between the plug and the walls of the aperture, and the strip ends thus securely held in fixed relation with the body. In applying the device to a severed chain, the strips are looped through the proximate links of the chain, and the hooked ends of the strips applied within the groove of the plug, as in the manner shown in Fig. 4 by dotted lines. The plug is then forced down into the aperture with the hand until the strip ends engage the edge of the smaller portion of the aperture, whereupon the plug is given a sharp hammer blow to force the same to effective or operative position, which acts, as will be obvious, may be accomplished in a rapid manner. The road or pavement engaging side of the device is preferably serrated, as at 20, so as to afford a better gripping effect therewith, and the upper face of the body is grooved or recessed in line with the strips to receive the folded over portion of such strips, which grooves are indicated at 21, thus presenting a flat upper surface upon which the tire may ride without doing injury thereto.

While the foregoing is the preferred embodiment of my invention, it is to be understood that I do not limit myself to the precise structure shown and described, as it is obvious that the same may be variously modified without departing from the spirit of the invention, as defined in the accompanying claims.

Having thus described my invention, what is claimed is:

1. A repair link for an antiskid chain for tires, comprising a body porton having an aperture therein, a wedge plug adapted to be driven into said aperture, and bendable strips carried by and extending in opposite directions from the body, said plug and strip ends being formed to provide a holdfast engagement therebetween in driving the plug into effective position.

2. A repair link for an antiskid chain for tires, comprising a body porton having an aperture therein, bendable strips carried by and extending in opposite directions from the body, and a plug adapted for forcing the strip ends into the aperture and binding the same between the plug and the walls of the aperture.

3. A repair link for an antiskid chain for tires, comprising a body portion having an aperture therein, bendable strips carried by and extending in opposite directions from the body and having hooked ends, and a plug having a grooved portion adapted to receive said hooked ends and to be driven into said aperture, whereby the strip ends, plug and body will be held in binding relation.

In testimony whereof I affix my signature.

OSWALD H. BEUTLER.